United States Patent [19]
Koizumi et al.

[11] Patent Number: 5,147,933
[45] Date of Patent: Sep. 15, 1992

[54] POLYPROPYLENE RESIN COMPOSITION

[75] Inventors: Junji Koizumi; Yoshito Yazaki, both of Aichi, Japan

[73] Assignee: Toyoda Gosei Co., Ltd., Nishikasugai, Japan

[21] Appl. No.: 689,171

[22] Filed: Apr. 24, 1991

[30] Foreign Application Priority Data

Apr. 27, 1990 [JP] Japan ................... 2-112000

[51] Int. Cl.⁵ .............................. C08L 53/00
[52] U.S. Cl. ......................... 525/89; 525/88; 524/505
[58] Field of Search ................... 525/88, 89

[56] References Cited

U.S. PATENT DOCUMENTS

| | | | |
|---|---|---|---|
| 3,562,790 | 2/1971 | Coover et al. | 525/88 |
| 4,211,690 | 7/1980 | Asano et al. | 525/89 |
| 4,319,004 | 3/1982 | Spielau et al. | 525/240 |
| 4,319,005 | 3/1982 | Spielau et al. | 525/88 |
| 4,412,016 | 10/1983 | Fukui et al. | 525/89 |

FOREIGN PATENT DOCUMENTS

| | | |
|---|---|---|
| 53-64257 | 6/1978 | Japan. |
| 57-159842 | 10/1982 | Japan. |
| 58-040341 | 3/1983 | Japan. |
| 2161490 | 1/1986 | United Kingdom. |

*Primary Examiner*—Carman J. Seccuro, Jr.
*Attorney, Agent, or Firm*—Cushman, Darby & Cushman

[57] ABSTRACT

A polypropylene resin composition having an impact resistance is disclosed, comprising
(a) a crystalline propylene polymer of an ethylene-propylene block copolymer type,
(b) an ethylene-propylene rubber, and
(c) a high density polyethylene, wherein said crystalline propylene polymer has a flexural modulus of 15,000 kgf/cm² (1,470 MPa) or more and an elongation at break of 30% or more, a weight ratio of (a)/(b) ranges from 100/5 to 100/50, and amount of (c) is from 5 to 30 wt % based on a total amount of (a) and (b).

6 Claims, No Drawings

POLYPROPYLENE RESIN COMPOSITION

BACKGROUND OF THE INVENTION

1. Field of the Invention

The present invention relates to a propylene polymer (PP) resin composition. More particularly, it relates to a propylene polymer (PP) resin composition which can be advantageously used as a molding material for producing PP molded parts required to have a well-balanced combination of rigidity and impact resistance. Examples of such PP molded parts include automotive internal and external trim parts required to have impact resistance as well as rigidity, such as lamp housings, trims, console boxes, grilles, pillar garnishes, etc.

2. Background Information

For producing automotive internal and external trim parts such as those mentioned above, PP resin compositions are recently being used in large quantities as molding materials, from the standpoints of material cost and light weight.

Since those molded parts are required to have both rigidity and impact resistance, PP resin compositions having impact-resistance have normally been used in which the polymer ingredients consist mainly of blends of a propylene-ethylene block copolymer (B-PP) and an ethylene-propylene rubber (EPR). (See, for example, JP-A-53-64257; the term "JP-A" as used herein means an "unexamined published Japanese patent application".)

However, the resin composition whose polymer ingredient consists mainly of the above-described polymer blend has had the following problems. In the case where molded parts having a certain degree of impact resistance (for example, 15 kgf.cm/cm (147 J/m) or more) are to be obtained, it is necessary to use a B-PP having a relatively high molecular weight (a relatively low MFR), so that the resulting composition is caused to have processability problems. (Normally, an MFR of 8 g/10 min. or more is required.) This poor processability is apt to adversely affect the finish of the final molded products. In addition, sufficient rigidity (for example, 22,000 kg/cm$^2$ (2160 MPa) or more in the case of formulations containing 25% of talc) has been difficult to obtain (see Comparative Example 1 in Table 4 below).

In the following description, the amounts of ingredients blended or incorporated are given by weight unless otherwise indicated.

Following is a list of abbreviations used herein.

PP . . . propylene polymer
B-PP . . . crystalline propylene polymer of an ethylene-propylene block copolymer type
EPR . . . ethylene-propylene rubber
PE . . . polyethylene
HDPE . . . high-density polyethylene
LDPE . . . low-density polyethylene
MFR . . . melt flow rate (the amount of polymer that is extruded from a nozzle having a diameter of 2.095 mm and a length of 8 mm at a temperature of 230° C. within 10 minutes under a load of 2.16 kgf (21.2 N); refer to ASTM-D1238.)
$ML_{1+4}(100°$ C.) . . . . Mooney viscosity (measured using the large disc (L) after one-minute warm-up at 100° C. and four-minute disc rotation)

SUMMARY OF THE INVENTION

Under the above-described circumstances, the present inventors have conducted intensive studies in order to develop a PP resin composition free of the above-described problems, and as a result, the present invention has been completed.

Accordingly, an object of the present invention is to provide a PP resin composition which can be molded, with good processability, into parts having a well-balanced combination of the contradictory properties, i.e., impact resistance and rigidity.

Other objects and effects of the present invention will be apparent from the following description.

The present invention relates to a polypropylene resin composition having an impact resistance comprising
 (a) a crystalline propylene polymer of an ethylene-propylene block copolymer type,
 (b) an ethylene-propylene rubber, and
 (c) a high density polyethylene,
wherein said crystalline propylene polymer has a flexural modulus of 15,000 kgf/cm$^2$ (1,470 MPa) or more and an elongation at break of 30% or more, a weight ratio of (a)/(b) ranges from 100/5 to 100/50, and amount of (c) is from 5 to 30 wt % based on a total amount of (a) and (b).

DETAILED DESCRIPTION OF THE INVENTION (1) The PP resin composition of the present invention contains a polymer ingredient mainly comprising a blend of a B-PP and an EPR. This is a prerequisite in the present invention.

(i) As the B-PP, a high-rigidity B-PP that will be specified later is used.

(ii) As the EPR, either of an ethylene-propylene copolymer (EPM) and an ethylene-propylene-unconjugated diene terpolymer (EPDM) may be used. Generally, an EPR has a propylene content of from 10 to 60% (preferably from 15 to 45%) and a Mooney viscosity, $ML_{1+4}(100°$ C.), of from 5 to 120 (preferably from 10 to 90) is used.

(iii) Besides the above-described polymers, the polymer ingredient further contains a high-density polyethylene (HDPE) described below, and further may preferably contain a high-elongation B-PP described below.

(2) The first characteristic feature of the present invention resides in that the B-PP constituting part of the polymer ingredient is a high-rigidity B-PP having an elongation at break (ASTM-D638) of 30% or more and a flexural modulus (ASTM-D790) of 15,000 kgf/cm$^2$ (1,470 MPa) or more, as measured on molded samples obtained therefrom.

If the elongation at break of the B-PP is less than 30%, sufficient impact resistance is difficult to obtain. If the flexural modulus thereof is less than 15,000 kgf/cm$^2$, it is difficult to impart desired rigidity to molded parts.

This high-rigidity B-PP generally has an MFR of from 10 to 40 g/10 min (preferably from 15 to 35 g/10 min) and an ethylene content of from 2 to 8%.

It is preferable, although not essential, that the high-rigidity B-PP be combined with a high-elongation B-PP. The blend ratio (by weight) of the high-rigidity B-PP to the high-elongation B-PP is generally from 9/1 to 1/9 and preferably from 9/1 to 4/6.

The above-mentioned high-elongation B-PP means a B-PP having an elongation at break (ASTM-D638) of 500% or more. In general, the high-elongation B-PP to be used has an MFR of from 5 to 15 g/10 min. and an ethylene content of 5 to 12%. If the MFR of the high-elongation B-PP used is less than 5 g/10 min., the composition as a whole has too low an MFR, resulting in poor processability (see Comparative Example 5).

(3) The blend ratio of the high-rigidity B-PP to the EPR described hereinabove is in the range of from 100/5 to 100/50 by weight (preferably from 100/5 to 100/30 by weight).

If the incorporated amount of the EPR is less than 5 parts, the effect of the incorporation of EPR (improvement in impact resistance etc.) cannot be produced. If the amount thereof exceeds 50 parts, the final molded parts come to have the nature of rubber rather than being resinous, so that such a composition cannot be a resin composition any longer.

(4) Another characteristic feature of the present invention resides in that the above-described polymer ingredient contains an HDPE in an amount of from 5 to 30 wt %, preferably from 5 to 25 wt % and more preferably from 5 to 15 wt % based on the amount of the polymer ingredient (i.e., the B-PP and EPR).

The "HDPE" herein means a PE having a density of 0.942 g/cm$^3$ or more (ASTM-D792). If the HDPE content is less than 5%, the effect of the incorporation of HDPE (improvement in impact resistance) cannot be brought about (see Comparative Example 2). If the HDPE content exceeds 30%, the final molded parts have considerably impaired heat resistance and rigidity.

(5) In the case where the final molded parts are required to have high rigidity, a reinforcing filler is normally incorporated into the polymer ingredient having the constitution described above. Examples of the reinforcing filler include talc, mica, calcium carbonate, silica, glass fibers, magnesium hydroxide, barium sulfate, and the like. The amount of such a reinforcing filler incorporated varies depending on the required rigidity level, but it generally is from 20 to 50 parts (preferably from 25 to 43 parts), per 100 parts of the polymer ingredient.

Further, additives such as a stabilizer, lubricant, colorant, plasticizer, etc. may suitably be added to the above-described polymers.

(6) The PP resin composition of the present invention can be obtained by weighing each of the ingredients described above and kneading these by means of an extruder-type kneading machine or other proper device, thereby to give a molding material in a pellet form.

As described above, the PP resin composition of the present invention comprises the specific high-rigidity PP and, blended therewith in specific proportions, an EPR and HDPE. Due to such a constitution, molded parts having well-balanced impact resistance and rigidity can be produced from the PP resin composition with good processability, as demonstrated by the Examples given below.

The present invention is explained below in more detail by reference to the following examples, which should not be construed to be limiting the scope of the invention.

EXAMPLES 1 TO 10 AND COMPARATIVE EXAMPLES 1 TO 5

According to the formulations shown in Table 4, PPs (PP-1 to PP-8) shown in Table 1 were blended with EPRs (EPR-1 and EPR-2) and PEs (PE-1 to PE-3) respectively shown in Tables 2 and 3, thereby preparing polymer ingredients. A filler and additive were added to each of the above-obtained polymer ingredients according to the formulation given below, and they were kneaded to prepare a molding material in a pellet form.

| Formulation | |
|---|---|
| Polymer ingredient | 75 parts |
| Talc | 25 parts |
| Stabilizer | 0.5 part |

Test pieces were prepared from each of the aboveobtained molding materials, and subjected to property measurements that are listed below together with measuring methods therefor.

(1) MFR ... ASTM-D1238 (Practical range: 8 g/min or more)

(2) Izod impact strength ... ASTM-D256 (Practical range: 15 kg.cm/cm or more (preferably 18 kg.cm/cm))

(3) Heat distortion temperature ... ASTM-D648 (Practical range: 68 or more (preferably 70 or more))

(4) Flexural modulus ... ASTM-D790 (Practical range: 22000 kg/cm$^2$ or more)

(5) Flexural strength ... ASTM-D790 (Practical range: 330 kg/cm$^2$ or more (preferably 340 kg/cm$^2$ or more))

From the results summarized in Table 4, it can be seen that the PP resin compositions of the Examples of the present invention not only have a well-balanced combination of impact resistance and rigidity as compared with the PP resin compositions of the Comparative Examples, but also show good processability with satisfactorily large MFR values.

TABLE 1

|  | PP-1 | PP-2 | PP-3 | PP-4 | PP-5 | PP-6 | PP-7 | PP-8 |
|---|---|---|---|---|---|---|---|---|
| Ethylene content (wt %) | 3.8 | 3.9 | 4.3 | 6.3 | 6.5 | 14.0 | 10.0 | 10.0 |
| MFR (g/10 min) | 30 | 16 | 30 | 30 | 10 | 1.2 | 30 | 10 |
| Elongation at break (%) | 100 | 160 | 30 | 20 | 700 | 700 | 800 | 250 |
| Flexural modulus (kg/cm$^2$) | 18,000 | 18,000 | 15,000 | 19,000 | 11,500 | 7,500 | 8,300 | 12,500 |

TABLE 2

|  | EPR-1 | EPR-2 |
|---|---|---|
| Mooney viscosity (ML$_{1+4}$ 100° C.) | 24 | 70 |
| Propylene content (wt %) | 26 | 27 |

TABLE 3

| | PE-1 | PE-2 | PE-3 |
|---|---|---|---|
| Type | HDPE | HDPE | LDPE |
| MFR (g/10 min) | 5 | 14 | 7.5 |

TABLE 4

| | PP Kind | PP wt % | PP Kind | PP wt % | EPR Kind | EPR wt % | PE Kind | PE wt % | MFR (g/10 min) | Izod impact strength (kg·cm/cm) | Heat distortion temperature (18.6 kg/cm$^2$ load) (°C) | Flexural modulus (kg/cm$^2$) | Flexural strength (kg/cm$^2$) |
|---|---|---|---|---|---|---|---|---|---|---|---|---|---|
| Example 1 | PP-1 | 60 | — | — | EPR1 | 7.5 | PE-1 | 7.5 | 13.2 | 15.2 | 78 | 25000 | 380 |
| Example 2 | " | 45 | PP-5 | 15 | " | " | " | " | 12.9 | 20.0 | 74 | 24800 | 370 |
| Example 3 | " | 30 | " | 30 | " | " | " | " | 9.4 | 26.7 | 71 | 24000 | 350 |
| Example 4 | " | 15 | " | 45 | " | " | " | " | 8.8 | 29.5 | 70 | 22800 | 340 |
| Comparative Example 1 | — | — | " | 60 | " | " | " | " | 7.7 | 34.0 | 68 | 20400 | 310 |
| Comparative Example 2 | PP-1 | 52.5 | " | 15 | " | " | — | — | 14.0 | 5.8 | 88 | 25700 | 380 |
| Comparative Example 3 | " | 45 | " | 15 | " | " | PE-3 | 7.5 | 11.8 | 18.9 | 66 | 20800 | 320 |
| Example 5 | " | " | " | " | " | " | PE-2 | 7.5 | 13.5 | 19.2 | 73 | 24500 | 360 |
| Example 6 | " | " | " | " | EPR2 | 7.5 | PE-1 | 7.5 | 12.5 | 20.8 | 73 | 24500 | 370 |
| Example 7 | PP-2 | " | " | " | EPR1 | 7.5 | " | " | 10.1 | 22.6 | 74 | 24800 | 370 |
| Example 8 | PP-3 | " | " | " | " | " | " | " | 14.2 | 15.5 | 69 | 23300 | 330 |
| Comparative Example 4 | PP-4 | 45 | PP-5 | 15 | EPR1 | 7.5 | PE-1 | 7.5 | 15.1 | 8.8 | 68 | 23700 | 340 |
| Comparative Example 5 | PP-1 | " | PP-6 | " | " | " | " | " | 6.5 | 23.5 | 68 | 23500 | 340 |
| Example 9 | " | " | PP-7 | " | " | " | " | " | 14.2 | 16.1 | 70 | 24000 | 370 |
| Example 10 | " | " | PP-8 | " | " | " | " | " | 12.5 | 15.6 | 71 | 25300 | 380 |
| Example 11 | " | 37.5 | PP-5 | 15 | " | 15 | " | " | 10.7 | 28.5 | 71 | 23000 | 340 |
| Example 12 | " | 30 | " | 15 | " | 15 | " | 15 | 9.8 | 32.3 | 69 | 22000 | 330 |

While the invention has been described in detail and with reference to specific embodiments thereof, it will be apparent to one skilled in the art that various changes and modifications can be made therein without departing from the spirit and scope thereof.

What is claimed is:

1. A polypropylene resin composition comprising
(a) 50 to 90 wt % of a blend comprising a crystalline ethylene-propylene block copolymer (X) having an MFR of from 10 to 40 g/10 min, an elongation at break of 70% or more and a flexural modulus of 15,000 kg/cm$^2$ or more and a crystalline ethylene-propylene block copolymer (Y) having an MFR of from 5 to 15 g/10 min, an elongation at break of 500% or more in a blending weight ratio of (X)/(Y) of from 9/1 to 1/9, said block copolymer (X) having a higher flexural modulus and lower elangation at break than said block copolymer (Y);
(b) 5 to 25 wt % of ethylene-propylene copolymer rubber having a Mooney Viscosity, ML$_{1+4}$ (100° C.), of from 10 to 90; and
(c) 5 to 25 wt % of a high-density polyethylene having an MFR of from 1 to 20 g/10 min.

2. The polypropylene resin composition as in claim 1, wherein the crystalline ethylene-propylene block copolymer (X) has an ethylene content of from 2 to 8 wt %.

3. The polypropylene resin composition as in claim 1, wherein the crystalline ethylene-propylene block copolymer (Y) has an ethylene content of from 5 to 12 wt %.

4. The polypropylene resin composition as in claim 1, wherein the ethylene-propylene copolymer (b) has a propylene content of from 15 to 45 wt %.

5. The polypropylene resin composition as in claim 1, wherein the high-density polyethylene (c) has a density of 0.942 g/cm$^3$ or more.

6. The polypropylene resin composition as in claim 1, further comprising a reinforcing filler in an amount of from 20 to 50 parts by weight per 100 parts by weight of (a) and (b).

* * * * *